FIG. I

INVENTORS.
LESLIE M. HARRIS, JR.
JERRY E. EVANS, JR.
BY T. L. Bowes
ATTORNEY

INVENTORS.
LESLIE M. HARRIS, JR.
JERRY E. EVANS, JR.
BY T. L. Bowes
ATTORNEY

*INVENTORS.*
LESLIE M. HARRIS, JR.
JERRY E. EVANS, JR.
*BY* T. L. Bowes
*ATTORNEY*

*INVENTORS.*
LESLIE M. HARRIS, JR.
JERRY E. EVANS, JR.
*BY* T. L. Bowes
ATTORNEY United States Patent Office 2,809,289

Patented Oct. 8, 1957

2,809,289

SQUELCH CIRCUIT

Leslie M. Harris, Jr., Fairport, and Jerry E. Evans, Jr., Rochester, N. Y., assignors to General Dynamics Corporation, Rochester, N. Y., a corporation of Delaware Application May 8, 1956, Serial No. 583,537

20 Claims. (Cl. 250—20)

Our invention relates to wave receivers and more particularly to squelch circuits for wave receivers.

Squelch circuits find their most frequent application in radio receivers intended to receive transmissions which are sporadic in nature, such as police and military communications, truck or taxi dispatching, and other point-to-point communications. If the receiver has no squelch circuit, the broad-band noise which issues from the loudspeaker of the receiver after a transmission is completed until the next transmission takes place proves both annoying and fatiguing to the listening operator. Squelch circuits may be used to automatically disconnect or short-circuit the audio section of a communications receiver when its output is principally noise, but to connect the audio portion of the receiver to the preceding stages whenever an intercepted transmitted signal exceeds a predetermined level or signal strength. Ideally, the predetermined level should be the minimum level at which satisfactory communication may be obtained.

Most squelch circuits of the prior art have proved relatively insensitive. They cannot be reliably adjusted to work on relatively weak intercepted signals, as they cannot sufficiently well distinguish between noise and a weak but adequate signal. Furthermore, circuits disclosed in the prior art have proved in general to be very delicately balanced and require constant recalibration in order to obtain satisfactory results in the more exacting communication services, such as military communications.

Those skilled in the art can readily appreciate that squelch circuits may find application in other types of receivers than communication receivers, and may be employed to work over different bands than the audio frequency band; for this reason, we prefer to refer to the final section of a wave receiver as a utilization means.

It is an object of our invention to provide a new and improved squelch circuit for a wave receiver.

It is a further object of our invention to provide a squelch circuit for a wave receiver which will operate satisfactorily on lower desired signal levels than squelch circuits known heretofore.

It is still another object of our invention to provide a squelch circuit for a wave receiver which is noise immune.

It is a further object of our invention to provide a squelch circuit that will only energize the utilization means when receiving an intelligible signal.

It is another object of our invention to provide a squelch circuit that will not allow the receiver to talk in the presence of large changes in the ambient noise level.

It is another object of our invention to provide in a squelch circuit for a wave receiver the means to introduce a locally generated keying signal into the receiver and recover said signal at a later stage of said receiver only when a received signal is present and thereby control the squelch action by the recovered locally generated keying signal.

Our invention is applicable to wave receivers of the superheterodyne type which include means for intercepting an intelligence-modulated transmitted signal, local oscillator means, mixer means, means for recovering the intelligence present in the resulting intermediate frequency signals, and utilization means. In general, we accomplish the foregoing and other objects of our invention by providing means for frequency modulating the local oscillator with a keying signal, and further providing means for comparing the phase of the keying signal applied to the local oscillator with the phase of the signals obtained by the intelligence recovery means. The keying signals will only be recovered by the recovery means when there is a signal present, as will be hereinafter explained. Broadly then, the presence or absence of a recovered keying signal will indicate if there is a signal present and these conditions can be used to control the squelch action. We also provide means responsive to a substantially in-phase condition in the phase comparison means for maintaining the connection between the recovery means and the utilization means, and responsive to a random average phase relationship in the phase comparison means for disconnecting the utilization means from the recovery means, thereby supplying squelch action.

Further objects and advantages of our invention will become apparent as the following description proceeds, and the features of novelty which characterize our invention will be pointed out with particularity in the claims annexed to and forming a part of this specification.

Throughout this specification and drawings, we have used the ground symbol to represent a convenient substantially equipotential plane, such as earth, a chassis, or any common connection, and the plus sign (+) to represent a suitable source of unidirectional potential, such as a battery, the negative terminal of which is connected to ground.

For a better understanding of the present invention, reference may be had to the accompanying drawings in which.

Figure 1:
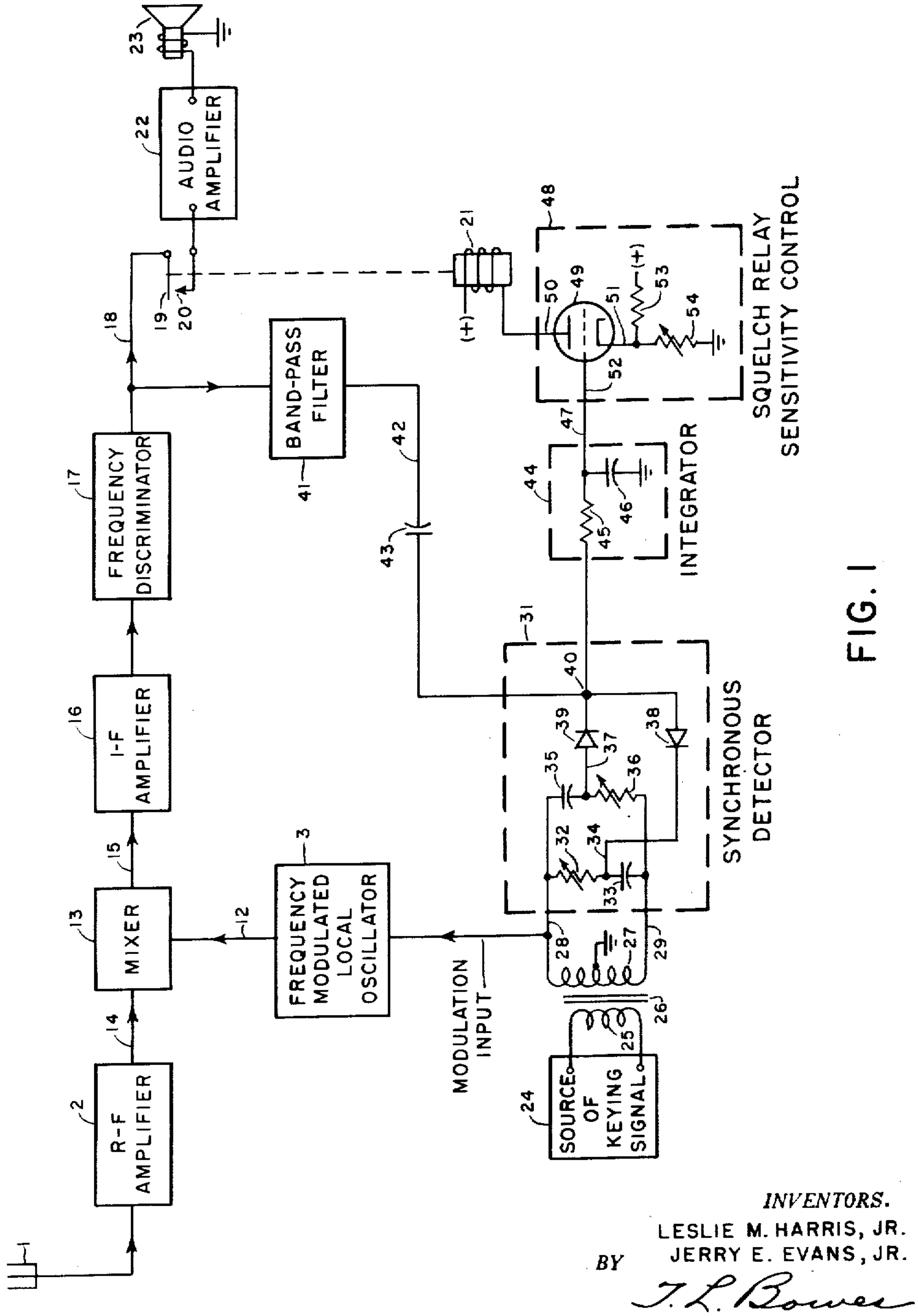
Fig. 1 shows, partially in block diagram form and partly in schematic wiring diagram form, a preferred embodiment of our invention.

Referring now to Fig. 1, there is shown a means for intercepting an intelligence-modulated transmitted signal, which may comprise an antenna 1 and an R.-F. amplifier circuit 2. There is also shown a frequency modulated local oscillator means 3 which is illustrated in block form since frequency modulated oscillators are well-known and the exact nature thereof forms no part of our invention.

A frequency modulated local oscillator signal appearing on lead 12 may be fed to mixer means 13, wherein the local oscillator signal is caused to beat with the received frequency modulated signal from R. F. amplifier 2 which appears on lead 14. The resulting intermediate frequency signals appearing on lead 15 may be amplified in intermediate frequency amplifier 16 and thereupon fed to frequency discriminator means 17 for recovery of the intelligence present in the received frequency modulated signal. The intelligence signals, which may be within the audio frequency range, may be fed via lead 18 through normally open contacts 19 and 20 of squelch relay 21 to suitable amplifying means, such as audio amplifier 22. The latter means causes the audio signals to be fed to a suitable transducer, such as loudspeaker 23. Audio amplifier 22 and loudspeaker 23 comprise utilization means for the signals appearing on lead 18.

In accordance with our invention, we provide a suitable source of keying signal 24 which is connected to primary 25 of transformer 26. Transformer 26 has a center-tapped secondary winding 27 which furnishes a pair of voltages on leads 28 and 29 which are approximately 180° out-of-phase. The keying signal on lead 28 is fed as the modulation input signal, to frequency modulated local oscillator 3 which in turn feeds mixer 12 with a signal that is frequency modulated by the keying signal from source 24.

The keying signal potentials appearing on leads 28 and 29 are fed in push-pull to synchronous detector means included in the dotted block outline 31. The latter includes means for presenting a pair of alternating voltages at the keying signal frequency which are substantially 180° out-of-phase with each other. This may be conveniently accomplished by taking one of the voltages from the junction of resistor 32 and capacitor 33 in series, and taking the other voltage from the junction of the capacitor 35 and resistor 36 in series. These output voltages appearing on leads 34 and 37, respectively, are fed to unidirectional conducting means, such as diodes 38 and 39, respectively. Diodes 38 and 39 are connected in series opposition with a junction connection 40 therebetween so that the D.-C. voltages developed by each of these diodes relative to ground buck each other.

Further in accordance with our invention, we may provide filter means 41 connected to discriminator means 17 and having a pass band centered about the keying signal frequency. We have indicated filter means 41 only generally, because the exact configuration of the filter means forms no part of our invention. The output of bandpass filter means 41 appearing on lead 42 may be coupled through capacitor 43 to junction 40 of the synchronous detector means 31.

The synchronous detector is made adjustable in order to compensate for phase shifts through mixer 13, I. F. amplifier 16, discriminator 17 and filter 41 and to set up a predetermined phase relationship between the two 180° out-of-phase voltages and the detected keying signal passed by filter 41. These adjustments are made by varying the size of resistors 32 and 36 so that the voltages on lines 34 and 37 are respectively in-phase and 180° out-of-phase with the signal on line 42 when a strong signal and little noise condition exists. As will be hereinafter explained, the phase relationship between the voltages on leads 34, 37 and 42 is indicative of the conditions of signal and noise present at the receiver input and is utilized to control the operation of the squelch.

The exact means whereby this phase relationship is established is not a part of this invention since other means to produce two 180° out-of-phase adjustable voltages and other means to filter the output of discriminator 17 will be obvious to a person skilled in the art.

Voltages appearing at junction 40 are preferably connected to integrating means 44, which may comprise, for example, series resistor 45 and shunt capacitor 46. The output of integrating means 44 is coupled by lead 47 to the relay control means 48, the latter means being arranged and connected to govern squelch relay 21. Control means 48 may comprise an electron discharge device 49 having an anode 50, a cathode 51, and a control electrode 52. The cathode 51 may be biased by resistors 53 and 54 in series, the resultant voltage divider being connected across a suitable source of unidirectional potential extending from (+) to ground. The junction between resistors 53 and 54 is connected to cathode 51 of discharge device 49. We prefer that resistor 54 be adjustable in value, so that the sensitivity of control means 48 may be readily varied to suit service conditions.

It is a function of our invention to provide means for closing relay 21, and thereby close contacts 19 and 20 to complete the audio circuit, whenever a signal above a predetermined level is intercepted by the receiver, but to leave relay 21 deenergized when noise alone, or a signal which is lower than the predetermined level, is present. From the circuit diagram of Fig. 1, it is apparent that relay 21 can be energized only when a sufficiently positive signal is present on lead 47 to cause tube 49 to conduct. This means that a waveform must be present at point 40 which will allow integrating network 44 to average that waveform and present a substantially D.-C. component to lead 47 whenever a desired transmitted signal is intercepted.

To accomplish this function, we provide, in accordance with out invention, means for adjusting resistors 32 and 36 in synchronous detecting means 31. Resistors 32 and 36 are adjusted when a signal above the predetermined level is being intercepted, until the waveform on lead 34 is substantially in phase with that present on lead 42, while that of lead 37 is substantially 180° out-of-phase with that of lead 42. The signal present on lead 42 during this adjustment is the filtered 10 kc. keying signal frequency component of the total signal which is detected by the discriminator. This phase relationship at the synchronous detector, once adjusted by resistors 32 and 36, will remain unaffected by noise or audio signals. The filter 41 serves to isolate the synchronous detector circuit from the detected signal containing audio information, yet allows the application to the detector of any other signals developed by discriminator 17 within the band pass of the filter. This would include noise frequencies and the keying signal frequencies if the latter is detected by the discriminator.

It is to be remembered that local oscillator means 3 is being frequency modulated by the keying signal at all times, whether a desired signal is being intercepted or not. When a signal is received, the keying signal will be detected by the discriminator and fed to the synchronous detector through the band pass filter in the predetermined phase relationship. As will be hereinafter explained, upon receiving a signal of greater than a predetermined level, a positive signal of sufficient amplitude will be applied to integrator 44, to thereby activate relay 21. When the received signal is less than said predetermined amplitude the voltage developed by the synchronous detector cannot overcome the bias on governing means 48 and therefore the squelch will be effective.

When no signal is present, however, local oscillator means 3 continues to beat its output against the noise components which are present on lead 14 but the keying signal will not be detected by the discriminator for reasons which will be hereinafter explained. Therefore, since the keying signal is not recovered by the discriminator, there will be no voltage developed by the synchronous detector at point 40, and consequently the squelch relay 21 will not be energized, thereby effectively squelching any noise appearing at then open contacts 19 and 20.

Figure 2:
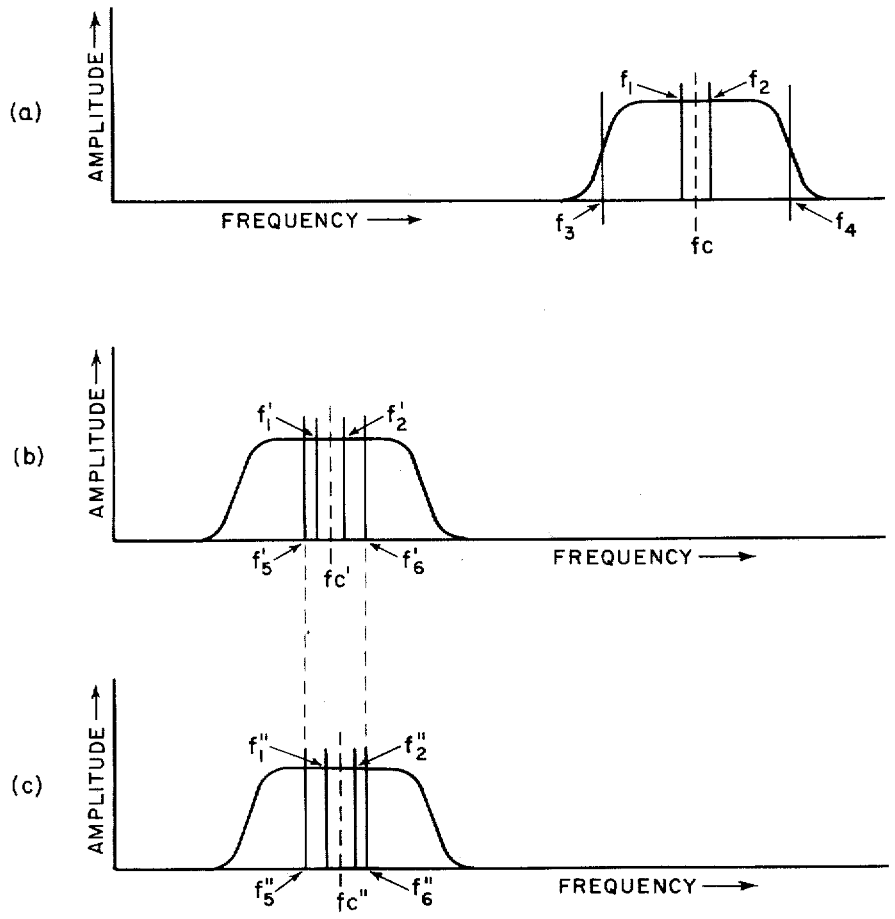
Figs. 2 and 3 show response curves useful in understanding our invention.

First the presence or absence of the keying signal on lead 42 depending upon the presence or absence of a transmitted signal will be explained with reference to Figures 2 and 3. Figure 2 contains a graphical analysis of the circuit operation during the reception of a strong transmitted signal with no noise present, while Figure 3 covers the no-transmitted-signal condition with a significant amount of noise. These two figures represent the two extreme conditions under which a receiver might operate, and are illustrated for the purpose of explaining the presence or absence of the 10 kc. keying signal at the output of the discriminator. It is believed that the operation of the system under any intermediate conditions will be better understood after explanation of Figures 2 and 3.

Figure 2 (*a*) is a graph of the frequency response curve of the R. F. amplifier 2 which feeds mixer 13. Frequency $f_c$ is the carrier frequency of the transmitted signal which varies between side frequencies $f_1$ and $f_2$. In the preferred embodiment of the system disclosed in Figure 1, the transmitted signal has a maximum frequency deviation in the order of 10 kc., thereby giving the signal a band width of approximately 20 kc. Frequencies $f_3$ and $f_4$ define the upper and lower cutoff points of R. F. amplifier 2.

Figure 2(*b*) shows the same response curve at a selected finite interval of time, after being heterodyned down to the intermediate frequency range. Superimposed on top of the curve at frequencies $f_5$ and $f_6$ is the upper and lower limits of the band pass of the I. F. amplifier 16. Amplifier 16 will therefore only pass a portion of the signals in the frequency range passed by the R. F. amplifier 2. Those frequencies passed will therefore have to lie between frequencies $f_5$ and $f_6$ in order to be available at discriminator 17.

Figure 2(*b*) illustrates the position of the transmitted signal with respect to the band pass of I. F. amplifier 16 at a selected time $T_1$ which coincides in time with the time at which the keying signal on line 28 that is frequency modulating the local oscillator 3 reaches its maximum positive amplitude and Figure 2(*c*) shows their relative relationship at time $T_2$ when the keying signal reaches its maximum negative amplitude. Frequencies $f_c'$, $f_1'$, $f_2'$ and $f_c''$, $f_1''$, $f_2''$ represent the frequencies corresponding to $f_c$, $f_1$, and $f_2$ of Figure 2(*a*) at times $T_1$ and $T_2$ respectively. The difference in frequency between corresponding points of the transmitted signal such as $f_1'$ and $f_1''$ in Figures 2(*b*) and 2(*c*) is a function of the amplitude of the keying signal. The rate at which the transmitted signal and the response curve move relative to the I. F. band pass is equal to the keying signal frequency. It is also noted that simultaneously with movement of the whole response curve and the transmitted signal relative to the I. F. band pass due to the frequency modulation by the 10 kc. keying signal, the intermediate frequency will also be varied in accordance with the modulation information from the received signal to thereby vary the frequency of the I. F. signal between frequencies limits $f_1'$ and $f_2'$ in accordance with normal frequency modulation operation. Therefore, the composite I. F. signal applied to discriminator 17 will be frequency modulated by two distinct signals, one the intercepted or received signal and the other the keying signal. Both signals are detected in accordance with normal discriminator action and the keying signal is applied to the synchronous detector 31 through filter 41. Since the audio frequency of the detected received signal lies below the cutoff frequency of the filter 41, it is only applied to the audio circuits. In view of the foregoing explanation, it has been demonstrated that when a received signal is present the keying signal is detected by discriminator 17 and applied to the synchronous detector 31 where it is converted to a positive bias to operate squelch relay 21 thereby enabling the audio circuits.

Figure 3:
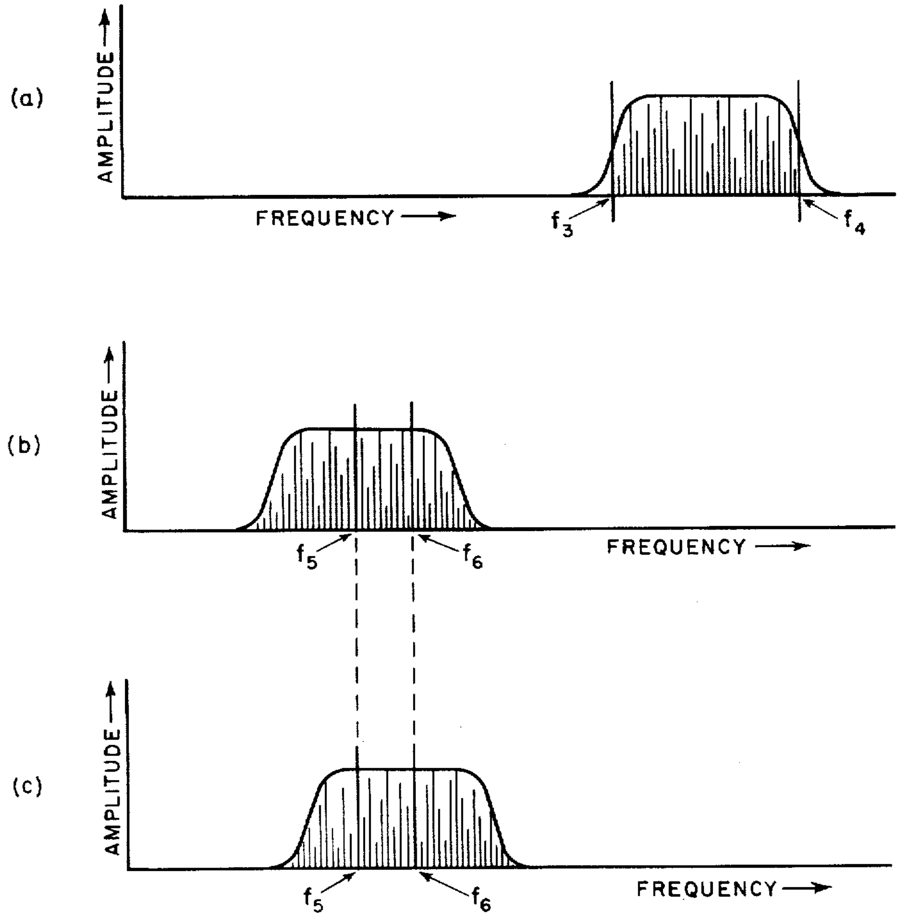

The graphs of Figure 3 differ from the corresponding graphs of Figure 2 only by the showing of the presence of noise covering the whole frequency spectrum within the response curve of R. F. amplifier 2 and the absence of a transmitted signal. Frequencies $f_3$, $f_4$, $f_5$, and $f_6$ relate to the band pass characteristics of the amplifiers as defined hereinbefore.

The noise within the response curve of R. F. amplifier 2 is characterized by its random nature and by the presence of frequencies simultaneously covering substantially the entire region within the response curve. This is distinguished from the condition illustrated in Figure 2 where at any given instant there is only one frequency present in the transmitted signal. Therefore, when the response curve is swept back and forth with relation to the I. F. band pass, at 10 kc. or whatever frequency happens to be chosen for the keying signal, it is noted that the discriminator cannot determine which portion of the R. F. spectrum it is receiving. This is so since there will be in general, signal frequencies of the same magnitude covering the entire I. F. spectrum at both $T_1$ and $T_2$ and also any intermediate time. Therefore, assuming perfect symmetry in the I. F. amplifier and discriminator, the average D.-C. discriminator output will be zero at all times between $T_1$ and $T_2$. Hence frequency modulating the continuous noise spectrum with the keying signal is without significance and the keying signal will not be recovered by the discriminator. Therefore, there will be no output voltage from the synchronous detector at point 40 to overcome the bias on control means 48 and the squelch relay will not be operated and the squelch will be effective. However, under the conditions set up for Figure 3 even though no keying signal will be recovered by discriminator 17, noise will be present at the output of discriminator 17 in the range within the band pass of filter 41 and will be applied to the synchronous detector.

Figure 4:
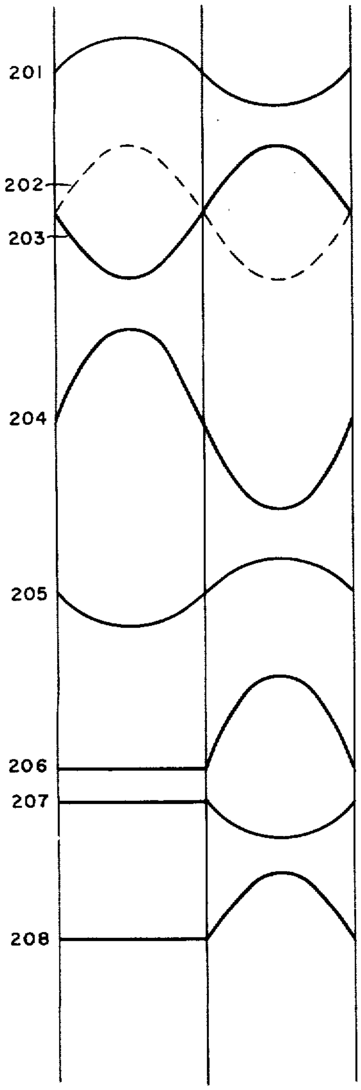
Figs. 4 and 5 show waveforms useful in understanding our invention.
Figure 5:
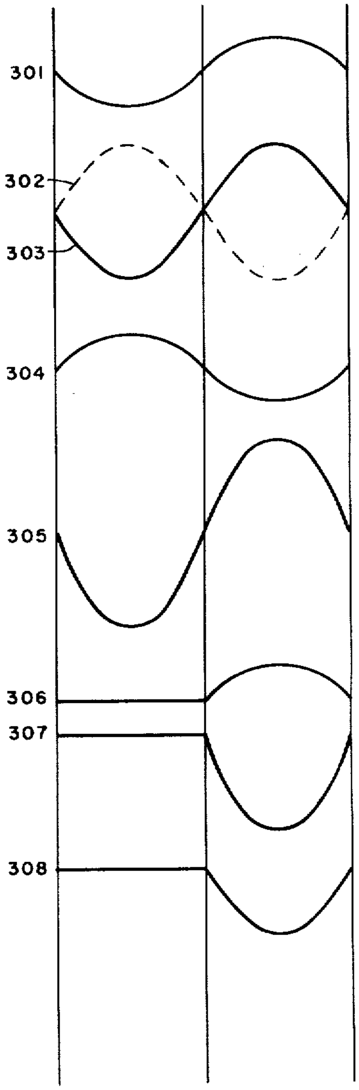

A better understanding of synchronous detector 31, shown in Fig. 1, may be obtained from a consideration of the extreme phase conditions encountered in the circuit, as illustrated in Figs. 4 and 5. Fig. 4 shows waveforms which may be encountered at various points in the circuit of Fig. 1 when a transmitted signal is being intercepted, or when an instantaneous noise component happens to be in the same phase. Waveform 201 is a sine wave representing a recovered keying signal on lead 42, while waveforms 202 and 203 are the waveforms of signals present on leads 34 and 37, respectively. Waveform 204 shows the net potential difference across unidirectional conducting means 39 as a result of the application of signal waveform 203 on lead 37 and signal waveform 201 on lead 42. Similarly, waveform 205 represents the net potential difference appearing across unidirectional conducting means 38, as a result of signal waveform 201 on lead 42 and signal waveform 202 on lead 34. The currents passed by unidirectional conducting means 39 and 38 are respectively shown as waveforms 206 and 207. The algebraic sum of current waveforms 206 and 207 is shown by signal waveform 208.

The opposite phase condition is illustrated in Fig. 5, wherein waveform 301 represents an instantaneous noise signal on lead 42 of opposite phase from waveform 201 of Fig. 4. Waveforms 302 and 303 correspond respectively to waveforms 202 and 203 in Fig. 2. Waveforms 304 and 305, which are respectively the potential differences applied to unidirectional conducting means 39 and 38, show the effect of the out-of-phase condition. Specifically, conduction by unidirectional conducting means 38 is considerably greater than that by unidirectional conducting means 39, as shown respectively by waveforms 307 and 306. The result of these two currents is signal waveform 308, which produces a negative D.-C. signal which is applied to integrating means 44.

It will be recognized that the momentary effects of the noise presented to the detector as illustrated in Figures 4 and 5 will be averaged out over a short period of time since noise by its very nature will average just as many pulses in the completely out-of-phase condition as in the in-phase condition. Furthermore, all phases are randomly but equally distributed between these two extreme conditions. The action of integrator 44 will serve to average out the in-phase and out-of-phase noise components and will in general produce very little net affect on control means 48. Therefore, the noise passed by filter 41 will not be effective to operate the relay and the squelch circuit will therefore be noise immune. By noise immune we means that changes in the ambient noise shall never cause the squelch to open, i. e., it will never cause relay 21 to operate thereby applying the noise to the audio output circuits.

The magnitude and polarity of the signal waveform produced by integrator 44 is an indication of the average phase relationship between the recovered keying signals and the two 180° out-of-phase keying signals produced by the detector. Therefore since this phase relationship is a measure of the average signal and noise conditions present at the receiver input, the sensitivity of the device may be varied by changing the bias on the squelch relay control triode 49 and consequently the magnitude of the output signal of integrator 44 necessary to overcome the bias and energize relay 21. These variations in bias of triode 49 are accomplished by adjusting resistor 54 until the desired sensitivity is reached.

It has been found as a matter of experience with our invention that a circuit of the sort diagrammed in Fig. 1 is able to complete the audio circuit on intercepted transmitted signal of a much lower predetermined level than squelch circuits known heretofore. We have found it possible to operate a squelch circuit according to our invention on a signal-plus-noise to noise ratio of less than 5 db. Large amounts of ambient noise have no effect on the circuit except to raise the level of signal required to obtain the necessary signal-plus-noise to noise ratio for operation.

While we have shown and described our invention as applied to a specific embodiment thereof, other modifications will readily occur to those skilled in the art. We do not, therefore, desire our invention to be limited to the specific arrangements shown and described, and we intend in the appended claims to cover all modifications within the spirit and scope of our invention.

What we claim is:

1. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; and means controlled by recovered keying signals for establishing said connection between said recovering means and said utilizing means.

2. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; filter means for passing said recovered keying signals and blocking said recovered intelligence-modulated signals, and means controlled by recovered keying signals passed by said filter means for establishing said connection between said recovering means and said utilizing means.

3. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; means for comparing the instantaneous phase relationship of a composite signal composed of said recovered keying signals and random noise signals, with keying signals from said source and for developing a signal representative of said instantaneous phase relationship, and means controlled by signals representative of a predetermined phase relationship for establishing the connection between said recovering means and said utilizing means.

4. The combination of claim 3 in which said comparing means has means for establishing said predetermined phase relationship, means for detecting a signal component of said composite signal having said predetermined phase relationship, means for detecting a signal component 180 degrees out-of-phase with said component having said predetermined phase relationship and means for summing said detected signals and applying the summated signals to said means controlled.

5. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; integrating means connected to said recovering means, and means connected to said integrating means controlled by recovered keying signals passed by said integrating means for establishing said connection between said recovering means and said utilizing means.

6. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; and means controlled by recovered keying signals for establishing said connection between said recovering means and said utilizing means, said controlled means having sensitivity control means which determines the minimum amplitude of keying signals for operating said controlled means to establish said connection.

7. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; filter means connected to said recovering means for passing said recovered keying signals and a band of random noise signals and blocking said recovered intelligence-modulated signals; means for comparing the instantaneous phase relationship of a composite signal composed of said recovered keying signals and said band of noise, with keying signals from said source and for developing a signal representative of said instantaneous phase relationship, and means controlled by signals representative of a predetermined phase relationship for establishing the connection between said recovering means and said utilizing means.

8. The combination of claim 7 in which said comparing means has means for establishing said predetermined phase relationship, means for detecting a signal component of said composite signal having said predetermined phase relationship, means for detecting a signal component 180 degrees out-of-phase with said component having said predetermined phase relationship and means for summing said detected signals and applying the summated signals to said means controlled.

9. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; filter means connected to said recovering means for passing said recovered keying signals and blocking said recovered intelligence-modulated signals; integrating means connected to said filter means and means connected to said integrating means controlled by said recovered keying signals passed by said integrator for establishing said connection between said recovering means and said utilizing means.

10. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; filter means connected to said recovering means for passing said recovered keying signals and blocking said recovered intelligence-modulated signals, and means controlled by said predetermined recovered keying signals for establishing said connection between said recovering means and said utilizing means, said controlled means having sensitivity control means which determines the minimum amplitude of keying signal for operating said controlled means to establish said connection.

11. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; means for comparing the instantaneous phase relationship of a composite signal composed of said recovered keying signals and a band of random noise signals and keying signals from said source and for developing a signal representative of said instantaneous phase relationship, integrating means for averaging said phase representative signals and means controlled by integrated signals representative of a predetermined phase relationship for establishing the connection between said recovering means and said utilizing means.

12. The combination of claim 11 in which said comparing means has means for establishing said predetermined phase relationship, means for detecting a signal component of said composite signal having said predetermined phase relationship, means for detecting a signal component 180 degrees out-of-phase with said component having said predetermined phase relationship and means for summing said detected signals and applying the summated signals to said means controlled.

13. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillaor with said keying signals from said source; means for beating the output of said local oscillator means with both of said received signals to produce intermediate frequency signals; means for receiving said intelligence-modulated signals and random noise signals together with said keying signals only when said intelligence-modulated signals are present; utilization means to be connected to said recovering means for utilizing said recovered intelligence; means for comparing the instantaneous phase relationship of a composite signal composed of said recovered keying signals and a band of random noise signals with keying signals from said source and for developing a signal representative of said instantaneous phase relationship; and means controlled by a signal representative of a predetermined phase relationship for establishing the connection between said recovering means and said utilizing means, said controlled means having sensitivity control means which determines the minimum amplitude of said signals representative of a predetermined phase relationship for operating said controlled means to establish said connection.

14. The combination of claim 13 in which said comparing means has means for establishing said predetermined phase relationship, means for detecting a signal component of said composite signal having said predetermined phase relationship, means for detecting a signal component 180 degrees out-of-phase with said component having said predetermined phase relationship and means for summing said detected signals and applying the summated signals to said means controlled.

15. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; integrating means for integrating said recovered keying signals and random noise signals present at the output of said recovering means, and means controlled by said integrated signals for establishing the connection between said recovering means and said utilizing means, said controlled means having sensitivity control means which determines the minimum amplitude of said integrated signals for operating said controlled means to establish said connection.

16. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; filter means connected to said recovering means for passing said recovered keying signals and a band of random noise signals and blocking said recovered intelligence-modulated signals; means for comparing the instantaneous phase relationship of a composite signal composed of said recovered keying signals and said band of noise, with keying signals from said source and for developing a signal representative of said instantaneous phase relationship; integrating means for averaging said phase representative signals, and means controlled by integrated signals representative of a predetermined phase relationship for establishing the connection between said recovering means and said utilizing means.

17. The combination of claim 16 in which said comparing means has means for establishing said predetermined phase relationship, means for detecting a signal component of said composite signal having said predetermined phase relationship, means for detecting a signal component 180 degrees out-of-phase with said component having said predetermined phase relationship and means for summing said detected signals and applying the summated signals to said means controlled.

18. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; filter means connected to said recovering means for passing said recovered keying signals and a band of random noise signals and blocking said recovered intelligence-modulated signals; means for comparing the instantaneous phase relationship of a composite signal composed of said recovered keying signals and said band of noise, with keying signals from said source and for developing a signal representative of said instantaneous phase relationship, and means controlled by a signal representative of a predetermined phase relationship for establishing the connection between said recovering means and said utilizing means, said controlled means having sensitivity control means which determines the minimum amplitude of said signals representative of a predetermined phase relationship for operating said controlled means to establish said connection.

19. The combination of claim 18 in which said comparing means has means for establishing said predetermined phase relationship, means for detecting a signal component of said composite signal having said predetermined phase relationship, means for detecting a signal component 180 degrees out-of-phase with said component having said predetermined phase relationship and means for summing said detected signals and applying the summated signals to said means controlled.

20. A squelch circuit in combination with a wave receiver of the superheterodyne type for receiving intelligence-modulated signals in the presence of random noise signals comprising means for receiving said intelligence-modulated signals and said random noise signals; local oscillator means; a source of keying signals; means for frequency-modulating said local oscillator with said keying signals from said source; means for beating the output of said local oscillator means with both of said received signals to produce intermediate frequency signals; means for recovering said intelligence-modulated signals and random noise signals together with said keying signals only when said intelligence-modulated signals are present; utilization means to be connected to said recovering means for utilizing said recovered intelligence; filter means connected to said recovering means for passing said recovered keying signals and a band of random noise signals and blocking said recovered intelligence-modulated signals; integrating means connected to said filter means and means connected to said integrating means for establishing said connection between said recovering means and said utilizing means upon receipt of integrated keying signals, said controlled means having sensitivity control means which determines the minimum amplitude of said predetermined integrated signals for operating said controlled means to establish said connection.

References Cited in the file of this patent

UNITED STATES PATENTS

| | | |
|---|---|---|
| 2,252,811 | Lowell | Aug. 19, 1941 |
| 2,552,585 | Rahmel | May 15, 1951 |

UNITED STATES PATENT OFFICE

CERTIFICATE OF CORRECTION

Patent No. 2,809,289 October 8, 1957

Leslie M. Harris, Jr., et al.

It is hereby certified that error appears in the printed specification of the above numbered patent requiring correction and that the said Letters Patent should read as corrected below.

Column 6, line 62, for "means" read --mean--; column 10, line 37, for "receiving" read --recovering--.

Signed and sealed this 17th day of December 1957.

(SEAL)
Attest:
KARL H. AXLINE

Attesting Officer

ROBERT C. WATSON
Commissioner of Patents